A. W. JUDY.
COUPLING.
APPLICATION FILED AUG. 6, 1918.
1,302,806.
Patented May 6, 1919.
2 SHEETS—SHEET 1.
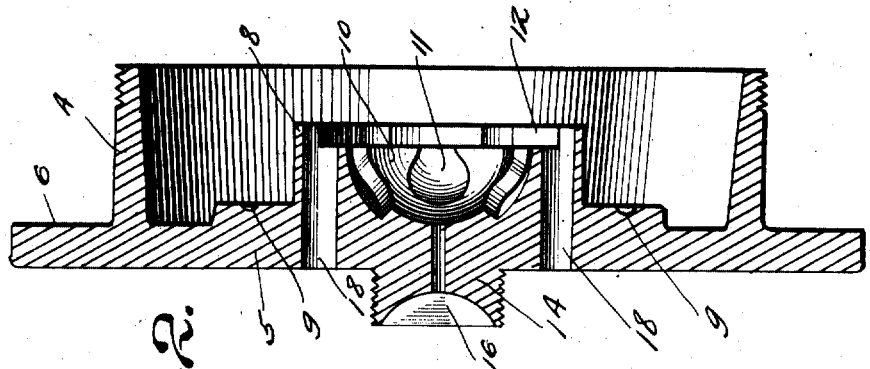
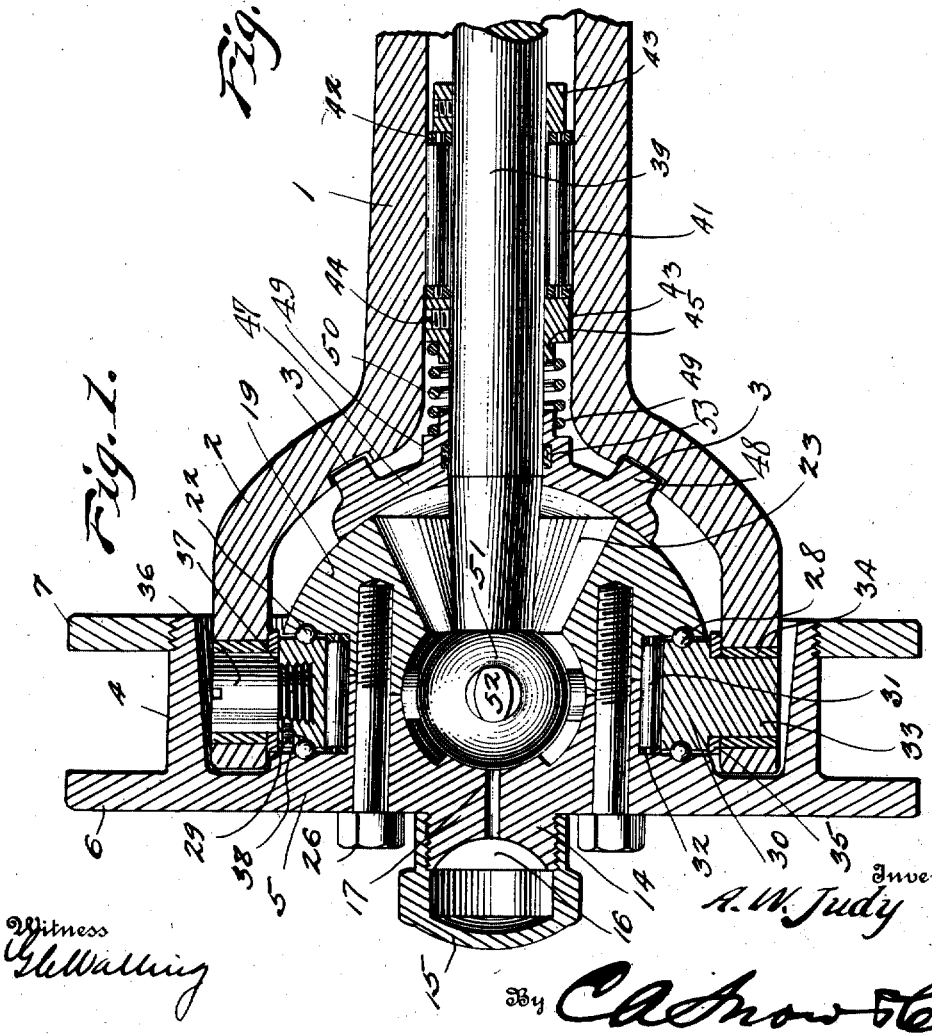

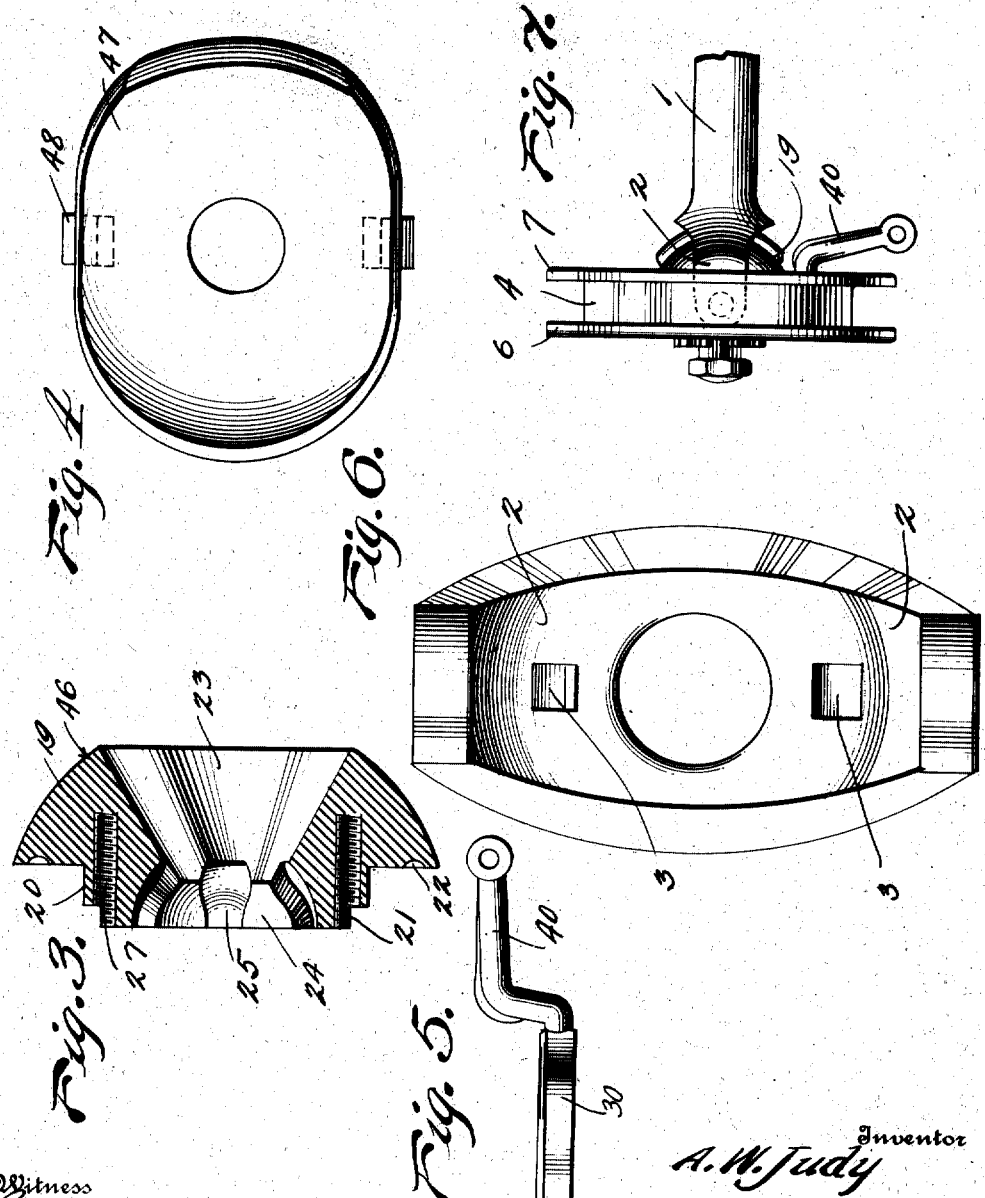

UNITED STATES PATENT OFFICE.

ANDREW W. JUDY, OF CENTERVILLE, IOWA, ASSIGNOR OF ONE-THIRD TO GEORGE M. BARNETT, OF CENTERVILLE, IOWA.

COUPLING.

1,302,806.          Specification of Letters Patent.         Patented May 6, 1919.

Application filed August 6, 1918. Serial No. 248,609.

*To all whom it may concern:*

Be it known that I, ANDREW W. JUDY, a citizen of the United States, residing at Centerville, in the county of Appanoose and State of Iowa, have invented a new and useful Coupling, of which the following is a specification.

The device forming the subject matter of this application is a universal coupling adapted for the general transmission of power, and peculiarly useful in driving the wheel of a vehicle.

The invention aims to provide a joint of the kind mentioned which will not bind in operation. Another object of the invention is to avoid the necessity of providing a jointed axle, and, consequently, affording a stronger construction than would otherwise be the case. A further object of the invention is to provide a means whereby the wheel is pivoted at a point in vertical alinement with the center of the tread of the wheel, thus lessening the wear on tires in turning corners, and reducing the drag on the steering mechanism.

The invention aims further, to provide a device which will permit the use of an unbroken housing extended entirely out to the wheel. Another object of the invention is to provide a joint or coupling of the kind mentioned, which will allow the wheel to turn through a large angle, and still be rotated without undue binding or friction.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention, parts appearing in elevation; Fig. 2 is a section showing the hub member; Fig. 3 is a section of the cap; Fig. 4 is an elevation showing the closure; Fig. 5 is an elevation showing one of the internal rings; Fig. 6 is an elevation showing the axle as viewed from its end; and Fig. 7 is a top plan showing the complete device.

The numeral 1 marks a tubular axle provided with arms 2. In the inner surfaces of the arms 2, recesses 3 are formed. The numeral 5 denotes a hub, having an annular rim 4 and provided with a fixed spoke flange 6 and with a removable spoke flange 7, presupposing that the structure is to form a part of a driving mechanism for a vehicle wheel. The part 5 has an internal projection 8 supplied on its vertical surface with a ball race 9. In the inner end of the projection 8 of the hub 5 there is fashioned a parti-spherical recess 10. In the inner surface of the recess 10, grooves 11 are formed. The grooves 11 preferably are broadened toward their outer ends, as shown in the drawings. In the end of the projection 8, a seat 12 is formed. The outer surface of the hub 5 is supplied with a boss 14 upon which is threaded an oil cup 15, there being a depression 16 in the outer end of the boss 14, adapted to receive a lubricant. A duct 17 leads from the depression 16 to the recess 10, and, obviously, when the cup 15 is screwed down, a lubricant may be forced into the interior of the structure, to oil its working parts. The projection 8 of the hub 5 is supplied with openings 18, disposed parallel to the axis of the hub.

The numeral 19 denotes a cap, the outer surface of which is spherical, as shown at 46. The cap 19 has a projection 20 and a reduced end 21. The reduced end 21 fits in the seat 12 of the projection 8 on the hub 5. In the vertical end surface of the cap 19, a ball race 22 is fashioned. The cap 19 is provided with a flared opening 23, leading to a parti-spherical recess 24, complemental to the recess 10 in the projection 8 of the hub 5. In the recess 24, grooves 25 are fashioned, the grooves 25 communicating with the grooves 11 in the recess 10 of the projection 8 on the hub, and being broadened toward their outer ends. Securing devices 26 which may be screws, pass through the openings 18 in the projection 8 of the hub and are received terminally in threaded openings 27 formed in the cap 19.

Balls 28 are located in the ball races 22 and 9, and between the balls is journaled a ring 30 having a projecting arm 40, adapted to be connected with the steering mechanism (not shown). The ring 30 rides on roller bearings 31 engaged with the part 20 of the cap 19 and with the periphery of the projection 8 on the hub 5. The ends of the roller bearings 31 are journaled in side rings 32. Any desired form of roller bearing may be used at this point. The ring 30 has a fixed stud 33 journaled in a bushing 34 carried by one of the arms 2 of the axle 1, and journaled in a washer 35 resting on the inner surface of the said arm. The ring 30 carries a removable stud 36 disposed diametrically opposite to the fixed stud 33, and preferably including a threaded stem 37, engaged with the ring, the stud being held in place by means of a set screw 38, threaded into the ring and engaging the stem 37 of the stud. A shaft 39 is mounted for rotation in the axle 1 and is supported on roller bearings 41 journaled in end rings 42 retained by collars 43 and 43ª held in place by set scews 44. The collar 43ª is provided with a neck 45. The invention comprises a closure 47 which prevents dirt from entering the opening 23 in the cap 19, the closure being shaped to conform to the spherical surface 46 of the cap. The closure 47 is supplied with lugs 48, received loosely but against rotation, in the recesses 3 fashioned in the inner surfaces of the arms 2 of the axle 1. On the outer surface of the closure 47, a neck 49 is formed. The neck 49 and the neck 45 of the collar 43ª receive the ends of a compression spring 50, which presses the closure 47 up against the spherical surface 46 of the cap 19 and affords a dust-tight joint. A packing ring 53 may be mounted in the closure 47 the same surrounding the shaft 30 closely, and serving to prevent the entrance of dust. The shaft 39 terminates in a spherical head 51 received in the chamber formed by the recess 24 of the cap 19 and the recess 10 of the projection 8 on the hub. The head 51 is supplied with projections 52, of any desired shape, received in the channels formed by the grooves 25 of the cap 19 and the corresponding grooves 11 of the projection 8 on the hub.

It will be obvious that when the shaft 39 is rotated, motion will be transmitted to the hub 5 by way of the projections 52 on the head 51. The hub is supported anti-frictionally by means of the roller bearing 31 and the ring 30, the ball bearings 28 taking up the thrust in a direction parallel to the shaft 29. The hub 5 may be swung in any desired direction by means of the arm 40, which swings the ring 30, and consequently the hub.

It is to be observed that the hub 5 is pivoted on the shaft 39 in vertical alinement with the tread of the hub and, consequently when the hub is swung laterally, a smooth motion will result, and the wear on the tires of the vehicle, presupposing that the device is used on a vehicle, will be eliminated. The construction is such that the joint is housed completely against the entrance of dust.

The structure is strong, durable and comprises a minimum number of parts. It will be found peculiarly useful wherever a compact universal joint is desired in connection with a driving shaft and a rotatable element.

Having thus described the invention, what is claimed is:—

In a device of the class described, a tubular axle provided with arms having recesses in their inner surfaces; a ring pivotally supported in the arms; a hub and a cap comprising parts journaled in the ring and provided with a chamber having grooves, the cap having an opening leading to the chamber; a shaft journaled in the axle and including a head located in the chamber and supplied with projections received in the grooves; and a closure for the opening bearing against the inner face of the cap, the closure having lugs fitting loosely but against rotation in the recesses of the arms.

In testimony that I claim the foregoing as my own, I have hereto affixed my signature in the presence of two witnesses.

ANDREW W. JUDY.

Witnesses:
  G. O. BARNETT,
  MILDRED BARNETT.